(No Model.) 3 Sheets—Sheet 1.
J. A. F. SVENSON.
LOADING MACHINE.
No. 533,184. Patented Jan. 29, 1895.
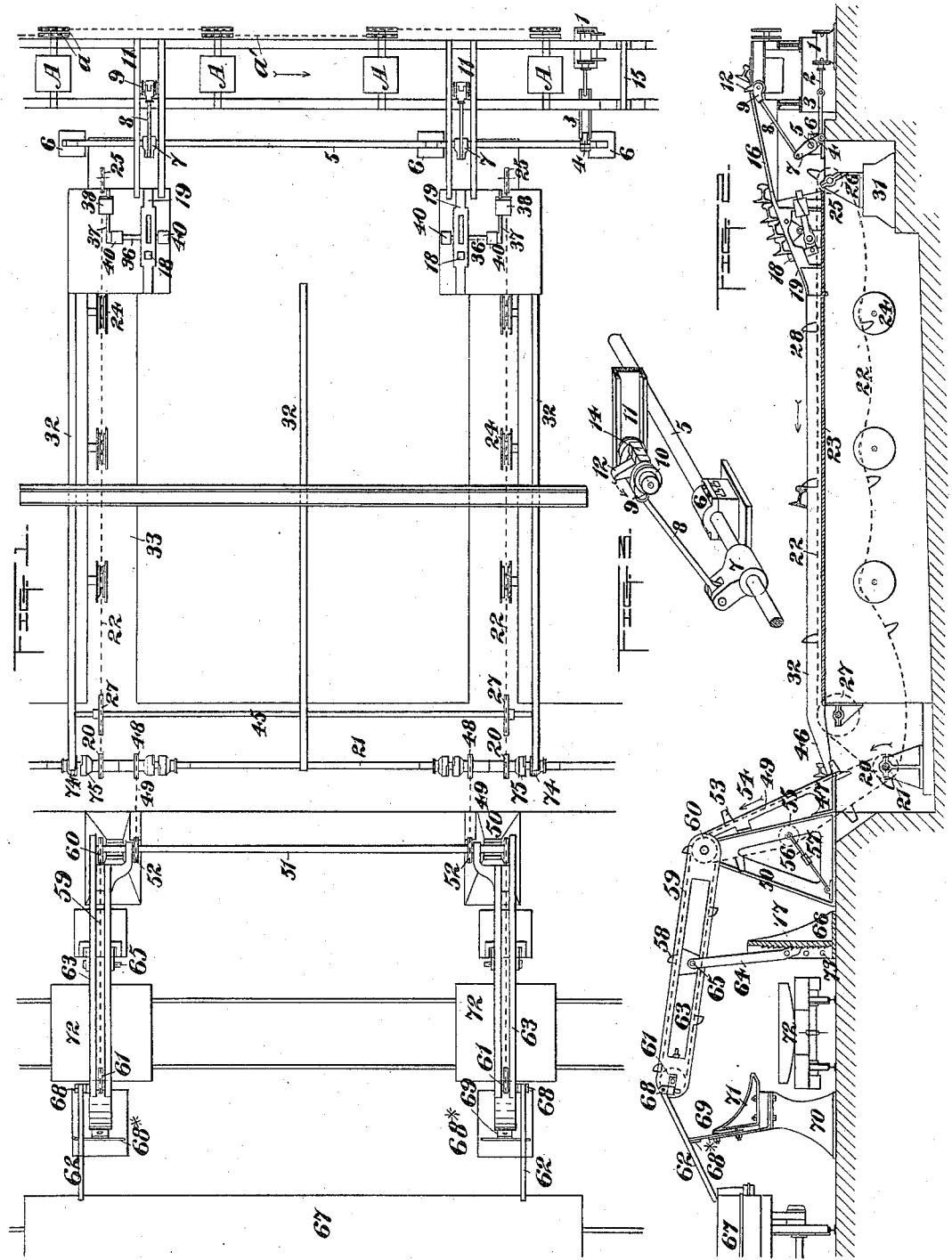
Witnesses.
Inventor John A. F. Svenson
by attorneys (No Model.) 3 Sheets—Sheet 2.
J. A. F. SVENSON.
LOADING MACHINE.
No. 533,184. Patented Jan. 29, 1895.
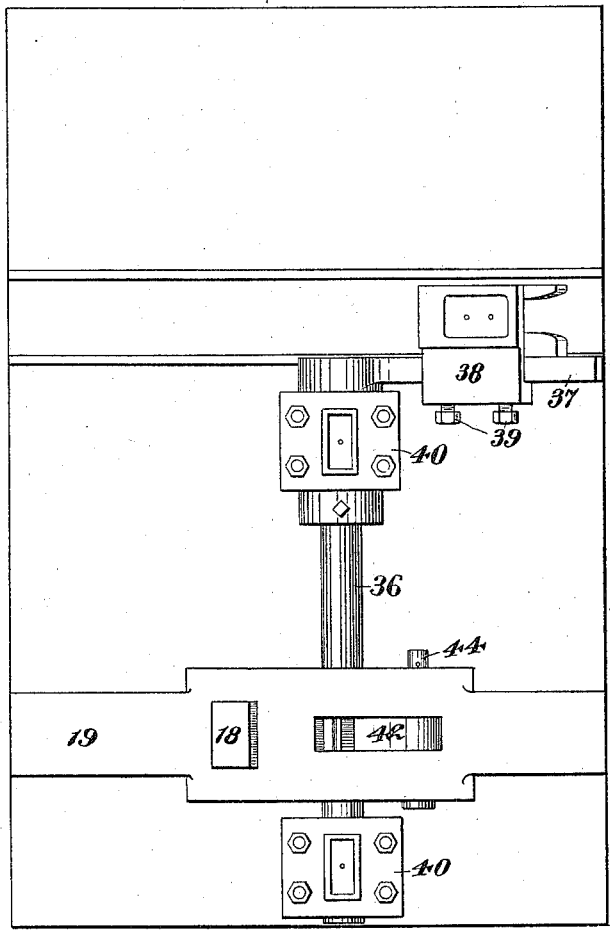
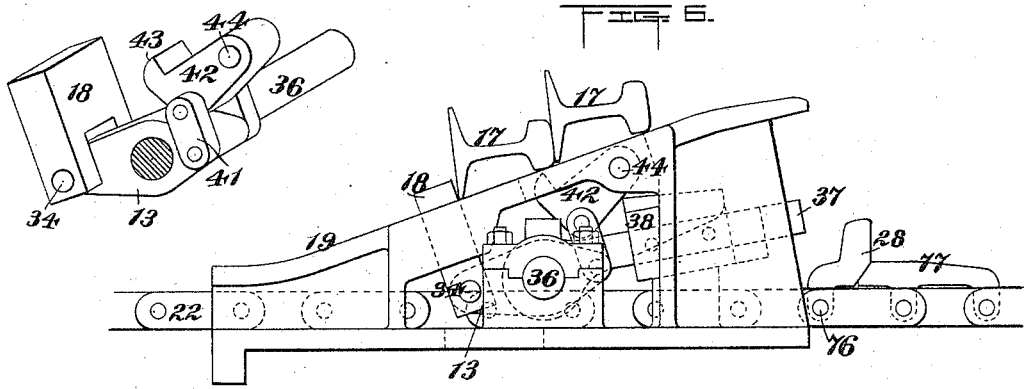

(No Model.) 3 Sheets—Sheet 3.
J. A. F. SVENSON.
LOADING MACHINE.
No. 533,184. Patented Jan. 29, 1895.
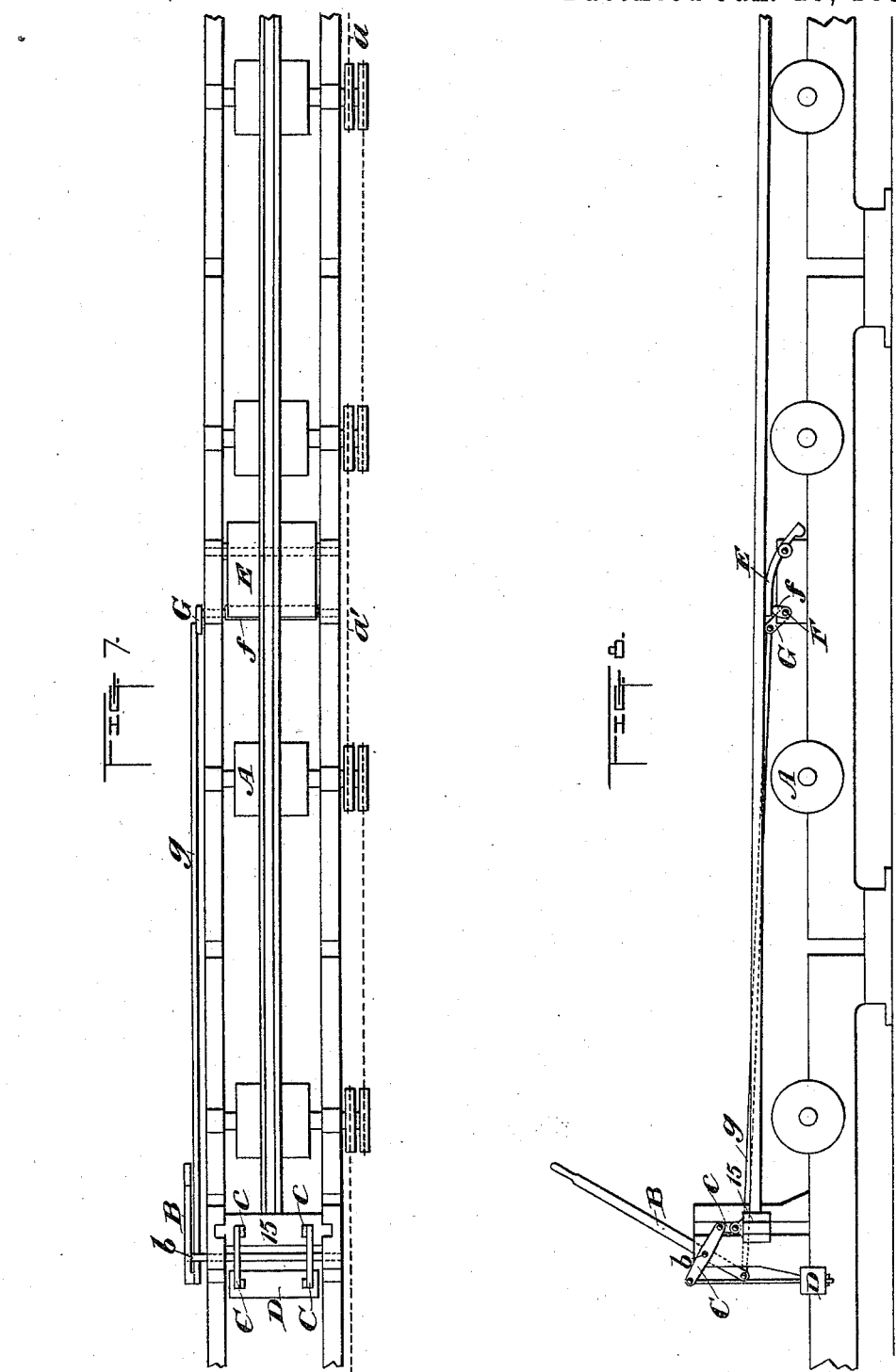

UNITED STATES PATENT OFFICE.

JOHN A. F. SVENSON, OF SCRANTON, PENNSYLVANIA, ASSIGNOR OF TWO-THIRDS TO CARL W. McKINNEY, OF SAME PLACE, AND JOHN C. H. WEHRUM, OF ELMHURST, PENNSYLVANIA.

LOADING-MACHINE.

SPECIFICATION forming part of Letters Patent No. 533,184, dated January 29, 1895.

Application filed August 10, 1894. Serial No. 519,946. (No model.)

*To all whom it may concern:*

Be it known that I, JOHN A. F. SVENSON, of Scranton, in the county of Lackawanna and State of Pennsylvania, have invented a new and useful Improvement in Loading-Machines, of which the following is a specification.

My invention relates to an improvement in loading machines in which provision is made for loading upon cars the output of bars from a rolling mill and more especially railway rails, whether such loading be for the purpose of shipment to distant localities or simply for transferring the bars from place to place within the precincts of the mill.

The object of my invention is to produce a loading machine which may be efficiently operated by one person.

A further object is to provide for loading different qualities of bars, traveling from the mill along the same pathway, onto separate cars without increasing the number of operators and a further object is to provide a loading machine of such a character that it may be employed to meet different contingencies of mill practice.

A practical embodiment of my invention is represented in the accompanying drawings, in which—

Figure 1 is a top view of a loading machine, certain parts being omitted to show more clearly the operative parts beneath them. Fig. 2 is a vertical section of the same, taken in a plane transverse to the path of the rails from the mill. Fig. 3 is a view in detail of the machine for transferring the rails laterally from the carriage or rollers which conduct them from the mill. Fig. 4 is an enlarged view in top plan of the slide for receiving the rails as they are moved from the carriages which conduct them from the mill. Fig. 5 is a view in detail of the mechanism for stopping the rails as they move down the slide and for distributing them, one by one, onto the conveyers. Fig. 6 is a view in end elevation of the slide and the distributing mechanism, showing its relation to the conveying chain or belt. Fig. 7 is a top plan view of a portion of the track along which the bars are advanced from the mill, showing the stop and retarding mechanism in its position thereon, and Fig. 8 is a view of the same in side elevation.

The bars to be loaded are moved from the finishing department of the rolling mill by means of a series of rollers A, driven, in the present instance, by sprocket wheels $a$ on their shafts, connected the one with another by sprocket chains $a'$; the original source of power being any convenient driving mechanism within the mill from which power is transmitted in any suitable manner to one of the roller shafts.

For purposes of my present invention, I have represented the rollers for advancing the bar to one loading mechanism and have broken off the continuous line of rollers at a point a short distance beyond the stop which is employed to arrest the travel of the bars for that particular loading mechanism, but my invention contemplates the advancement of certain of the bars at the will of the operator along a continued series of rollers A to a second loading mechanism, quite similar to that to be hereinafter described, provision being made to arrest the bars for that loading mechanism and said stop mechanism being under the control of the one operator conveniently located along the line of travel of the bars.

My invention further contemplates still other loading mechanisms, similar to that to be hereinafter described, for removing the bars from the single successive line of rollers A onto suitable cars or carriages, or other receiving devices, where such additional loading mechanisms are found advantageous or desirable.

The bars, as they reach a position where they are to be transferred from the rollers A onto the car or other receiver, are arrested in their advance movement by means to be hereinafter particularly described and are then transferred laterally from the rollers A on downwardly slanting supports along which they will slide, under the influence of gravity, until they are arrested at the desired point. The mechanism for accomplishing this lateral movement of the bars is constructed and arranged as follows:

A cylinder 1, into which steam, water, or any other suitable fluid, under pressure, is admitted by means of valves arranged in any well known or suitable manner, is under the control of the operator to admit the fluid and start the movement of the piston therein. The piston, which works within the cylinder, has its rod 2 connected by links 3 with an arm 4 on a rock shaft 5. The shaft 5, mounted in bearings 6, has also secured to it arms 7, which latter—through links 8—communicate a reciprocating motion to carriages 9, in the present instance two in number. The wheels 10 of the carriage 9 run upon the lower flanges of guide bars 11, arranged transversely across the track beneath the path of the bars advancing on the rollers A, said guide bars 11 being also provided with top flanges to prevent the carriage from tilting under the influence of the inclined direction of the links 8. The carriage 9 has provided on its axles, catches 12, so arranged that they may freely tilt in the direction shown by the arrow in Fig. 3, but are prevented, by a suitable stop, not shown, secured to the carriage frame, from tilting in the opposite direction. Weights 14 are employed to hold the catches 12 normally in an upright position and to return them to an upright position, whenever they are left free to do so.

In operation, suppose one or more bars to have advanced along the rollers A to a position where their opposite ends are about equidistant from the carriage 9. The operator, having arrested the bar or bars in this position, sets in operation the piston within the cylinder 1 and thereby causes the carriage 9, with its catches 12, to reciprocate beneath the bars. As the carriage passes beneath the bars, the catches 12 will tilt forwardly and permit the carriage to slide rearwardly without obstruction but, so soon as the carriage is advanced, the catches 12 will maintain their upright position and will engage the bars on the rollers A and move them laterally from the rollers onto the inclines 16 and 19; the former of which may be a continuation of the guide bars 11. The inclination of the inclines 16 and 19 is such that the bars, aided by the momentum imparted to them by the carriage, will slide down the inclines until they are arrested by the stops 18 projecting upwardly through the faces of the inclines 19 where they will remain in a series, as shown in Fig. 2, until they are transferred, one by one, from the inclines 19 onto conveyers in the manner to be hereinafter described.

The bars, as they accumulate upon the inclines 16 and 19, or after they have so accumulated, are transferred, one by one, to the car or other receptacle as follows:—21 is a horizontal shaft driven by a belt or any other suitable source of power in the direction indicated by the arrow. This shaft is provided with sprocket wheels 20 which impart motion to endless chains 22, two or more in number, in the present instance two being shown, which chains are provided with catches 28, placed at suitable intervals thereon. As the chains are driven in the direction indicated by the arrow in Fig. 2, any loose object placed in front of the catches 28 will be compelled to move in the same direction. The upper or working portions of chains 22 slide upon ways or plates 23, which are shown in Fig. 2, but are removed in Fig. 1, while the lower portions are merely supported at intervals by loose pulleys, placed at such distances apart as to prevent the chains or catches from dragging on the floor or ground. At their opposite ends, the chains pass around sprocket wheels 25 similar to the sprocket wheels 20, excepting that the sprocket wheels 25 are idly revolved by the chains in bearings 26 which are movably secured to bases 31, so that they may be adjusted to regulate the slackness of the chains. The ways 23 over the openings or pits 33 in which the lower portions of the chains are made to run, and supports 32, in the present instance three in number, are employed to support the rail as it is being slid along by the catches 28 on the chain 22.

The particular mechanism for removing the bars one by one from the incline 19, which mechanism is under the control of the chains 22, is constructed as follows:—Vertically movable contact pieces 38 are so located that the chains 22 must pass underneath them in proximity thereto. The pieces 38 are tapered on their lower surfaces to form inverted inclines with which the catches 28 engage as they are moved along by the chains 22. Each catch raises the contact piece a certain distance, after which, when the catch has passed on, said contact piece again returns under the influence of gravity to its normal position. The contact pieces 38 are connected by means of arms 37 and set screws 39 to rock shafts 36. The required amount of rotary movement of the shaft is determined by locating the contact pieces normally nearer to or farther away from the chains 22 and also by adjusting them nearer to or farther away from the shaft with which they rock. The shafts 36 supported in their bearings 40, also carry securely fastened thereto, arms 13 to one end of which arms the pieces 18 are connected by pins 34. The pieces 18 are made to move freely in openings through the inclines 19. The other ends of the arms 13 are movably connected by means of links 41 to latches 42, which latter swing on pins 44, fastened in inclines 19, as shown. When the mechanism is at rest, the pieces 18 project above the surface of inclines 19 affording stops which prevent the bars 17 from sliding down off the inclines 19 until they are intentionally moved. When the stops 18 are projected upwardly in their normal positions, the latches 42 are entirely below the top surface of the inclines 19.

So far as the conveying chains and the mechanisms for distributing the bars onto the conveying chains, one by one, are concerned, the operation is as follows:—When the contact pieces 38 have been lifted by the catches 28 on the chains 22, the shaft 36 will have been rocked in a direction to withdraw the stop pieces 18 from above the surface of the inclines 19. Simultaneously with the withdrawal of pieces 18, the hooked ends 43 of the catches 42 will be made to rise, coming in contact with that bar 17 which is situated nearest to the pieces 18 and exerting upon it a tilting action. The result is that this bar 17, so tilted, being upon an incline and having its inertia disturbed by said tilting, will move along down the inclines 19 and tilt upon the horizontal supports 32 in position to be slid along on said supports by the catches 28 as the chains 22 are advanced. The upward swing of the latches 42 furthermore, by presenting their hooked ends in front of the second bar, will prevent it and those behind it from sliding down the inclines 19, until the catches 28 on the chains 22 shall have passed the contact pieces 38 and thereby permitted the shaft 36 to rock back again into its normal position with the stop pieces 18 again projected above the faces of the slides. This movement will also withdraw the catch 42 from in front of the bar and it, together with those behind it, will thereupon move down the inclines 19 into contact with the stop pieces 18 to be again operated upon by a succeeding catch 28 in the manner above described.

The carrier chains 22 pass over idler sprocket wheels 27 mounted upon a shaft 45 revolving in bearings, as shown in Fig. 2, the idlers 27, being located at an elevation differing from that of the driving sprocket wheels 20, giving to the path of the chains a sudden dip, causing them to diverge from the supports 32. It follows therefore that the catches 28, after having passed over the idlers 27, will disappear below the top surface of the supports 32 and, when this takes place, the bars previously propelled by the catches will be free from the action of the catches. The momentum of the bars, supplemented by a slight downward curvature of the supports 32 at that end, will cause the bars to move on until they come in contact with a steep incline 47 from which point they are lifted by other endless carriers as follows:

Upon the driving shaft 21, there are mounted sprocket wheels 48, two or more in number, in the present instance two being shown, which may be made to revolve with the shaft at pleasure. A second shaft 51 is mounted in suitable bearings in the top of uprising brackets 50, and is provided with sprocket wheels 52, corresponding to the sprocket wheels 48 on the shaft 21. Endless chains 49 pass over the sprocket wheels 52 and 48, which chains are driven by the shaft 21 when the sprocket wheels 48 are locked to the shaft 21 by clutches carried by said shaft. The endless chains 49 are provided with a suitable number of catches 53 of suitable size and shape to lift the bars 17 up and along the inclines 47 attached to the brackets 50. The inclines 47 if desired may be made of such a cross section, viz., with longitudinal recesses or troughs along their faces, that they make suitable paths for the chains 49. The return portions of the chains 49 pass over guide pulleys 55 connected to the brackets 50 by swinging rods or arms 56. The lengths of such arms or rods may be varied by adjusting nuts 57 to give the chains 49 the necessary amount of tension, in order to keep them from buckling in the vicinity of a catch when the latter is under strain by the weight of a bar being carried up the incline 47. As the bars arrive in section at the point 46 where they are released from the catches 28 upon chains 22, as previously described, they are caught by the ascending catches 53 upon chain 49 and lifted to the tops of brackets 50. At this point, the catches 53 release the bars and the latter are caught by other catches 58, fastened to the endless chains 59 which run around sprocket wheels 60 and 61, the former forced to rotate with the shaft 51 and the latter mounted to rotate freely in the ends of arms 63, pivoted at one end to the shaft 51 and free at their opposite ends to be elevated and depressed, as may be desired. Since the sprocket wheels 52 and 60 are secured to the same shaft 51 and since the chain 49, by causing the shaft 51 to revolve, thereby imparting motion to chains 59, it will follow that chains 49 and 59 must always run in harmony, so that when the catch 53 has let go of the bar at the top of brackets 50, another catch 58 will always be in readiness behind the same bar. As the bars reach the free ends of the arms 63, they are received upon skids 62, on which they slide under the influence of gravity onto or into cars 67, conveniently placed on a track running at right angles to the movement of the bars.

The skids 62 are secured at one end to the arms 63 in such a manner that their other ends are free to swing in all directions, this being accomplished by a universal joint 68 of any well known or approved form. Thus, if it happen that the railway car 67 is inadvertently moved along the track while the free ends of sockets 62 are in contact with it, the universal joint 68 will obviate any damage which would naturally result if there were a stiff connection between the said skids and the arms 63.

The free ends of the skids 62 may or may not rest immediately on the car 67. When it becomes desirable that they should not rest on the car, the said skids may be supported upon cross pieces 68*, secured to uprights 69 which, in turn, are adjustable in any well known or approved manner as to height and fastened to brackets 70 firmly held down to suitable foundations. The arms 63, fulcrumed on the shaft 51, may be swung in a vertical plane around said shaft and this will permit them to be adjusted to set screws of varying heights. The said arms 63 are held in the desired position by supports 64 attached to the arms by pivot pins 65 and having at their lower ends projections 77 which latter correspond to and engage ratchet notches in the vertical surface of pieces 66, secured to suitable foundations. By adjusting the supports 64 up and down along the teeth on supports 66, the arm 63 may have its free end raised and lowered, as may be desired.

In order to prevent the accidental displacement of the support 64, I provide holes 73 in the support 66 and a corresponding hole in the support 64 and lock the support 64 in its adjustment by inserting a pin through the support into one of the holes in the bracket.

I have shown two arms 63, with their several operating elements and this is the number which I find it convenient to use, but if the bars were of excessive length and weight, it might be desirable to employ more than two, but their construction and arrangement would be obvious, as they would be mounted and fitted in a manner quite similar to that shown and described with respect to the arm 63.

Returning now to the rollers A, on which the bar is brought from the mill to be transferred onto the loading mechanism, it becomes desirable, for reasons which will be hereinafter more fully stated, to arrest some of the bars and permit others to pass onto the second loading mechanism and, in any event, it is desirable to arrest the progress of the bar along the rollers A before starting the mechanism in motion, which transfers it laterally to be loaded. To accomplish this, I provide a movable stop 15 under the control of the operator to be thrown into and out of position to arrest the advancing bar at his pleasure. The stop 15 is operated by a lever B secured to a rock shaft $b$, the latter being provided with arms C connected by links $c$ with a movable stop 15. The said shaft $b$ is further provided with a counterweight D for rendering the movement of the operating lever easier. When the operating lever is thrown in one direction, it will lift the stop 15 and when thrown in the opposite direction it will lower it into position to arrest the advancing bar.

It is further desirable that the momentum of the bar, as it is moved along the rollers A, should be materially reduced before it comes in contact with the stop 15, as it is of advantage in loading rapidly that the bars should be moved along the rollers A at a rapid rate, and the shock incident to the sudden stoppage of a heavy bar running at such speed would be liable to produce injury to the machine. To gradually arrest the movement of the bar as it approaches the stop 15, I provide a swinging friction plate E a little less than half the length of the bar from the stop 15, which friction plate is so mounted that it may be lifted slightly above the upper surfaces of the rollers A and take upon itself the weight of the bar, thereby throwing the rollers A in advance of it out of use. This swinging friction plate is operated by means of a cam $f$ on a rock shaft F provided with a crank arm G connected by a rod $g$ with the stop operating lever B. The connection between the stop operating lever B and the friction plate operating shaft is such that when the stop operating lever is moved in a direction to lower the stop into position to arrest the bar, it will simultaneously therewith lift the friction plate into position to receive the weight of the advancing bar and lift it from the rollers. On the other hand, when the stop operating lever is thrown in a direction to lift the stop and permit the bar to pass on, it will—simultaneously therewith—lower the friction plate below the upper surfaces of the rollers A and thereby permit them to continue the advance movement of the bar.

The output of a mill, producing railway bars, consists commonly of two kinds of bars, viz., first quality and second quality. These commonly come from the finishing department mixed together, though they may be classified by some conventional marking. There is also frequently mixed with these two kinds a third grade which requires subsequent treatment, and these may be designated as "cuts." It is always necessary ultimately to separate the various grades of bars from each other and this separation is one of the functions of the machine hereinabove described. To carry this into effect, it is preferable to arrange the loading mechanism in duplicate, that is to extend the line of rollers marked A so as to form a connection between two complete loading machines, such as heretofore described, it being the duty of a single operator located between the two machines, to stop bars of one quality at the first loading mechanism and permit bars of another quality to pass onto the second loading mechanism. In case a "cut" comes along in proximity to the first or second quality, the stops of the two rolling mechanisms may be elevated and the "cut" allowed to pass on out of the range of their loading mechanism, to be received by some suitable device not shown herein and not forming any part of the present invention.

By means of the universal joint 68, the skids 62 may at will be swung back, until their free ends point toward the sprocket wheel 60. This being down on the second loading machine, the bars going out of it, after reaching the ends of arms 63, drop into an open space, and so doing they may be made to strike a curved piece 71 (see Fig. 2) attached to brackets 70, so formed as to guide the bars onto small trucks 72 conveniently placed upon railway tracks for this purpose.

The structure is such that either one or both loading mechanisms may be employed to load the bars onto cars 67 or onto trucks 72, or the one may be arranged to load on the cars 67, while the other is loading onto trucks 72.

While it is preferred to introduce the supports 32 and carrying chains 22 as a part of the loading mechanism, they do not of necessity form a part of the loading mechanism, as it is perfectly feasible where the bars are to be loaded onto the cars as fast as they accumulate on the inclines 19, to locate the steep inclines 47 and carrier chains 49 in proximity to the inclines 19 so that the bars, as they escape from the inclines 19, will be carried directly up the inclines 47 and thence onto the cars. This arrangement requires no further adaptation of the parts already described than simply to locate the carrier chains 49 in such position with respect to the bearing pieces 38 that the said bearing pieces 38 and hence the separate mechanism will be operated by the catches 53 on the chains 49, instead of by the catches 28 on the chains 22. The supports 32, however, form a very convenient place for storing the output of the mill for a half or whole day even, when cars do not chance to be available, the carrying chains 22 being in this instance thrown out of use and the bars moved from the inclines 19 and piled in one or more tiers on the supports. In such case, when the bars stored on the supports 32 are to be loaded, they must be fed by hand to the carrier chains 49 until the accumulation of stored bars has been exhausted, when the machine may be set in operation again as a whole.

It is obvious that numerous slight changes might be resorted to in the form and arrangement of the several parts without departing from the spirit and scope of my invention. Hence I do not wish to limit myself strictly to the structure herein set forth, but

What I claim is—

1. A loading machine, comprising carriages for advancing the bars lengthwise away from the mill, inclines at the side of the carriages for receiving the bars laterally with respect to their path of travel from the mill, carriers in position to receive the bars from the inclines and continue their movement in the same direction as the inclines, means for transferring the bars at pleasure from the carriages to the inclines and means for distributing the bars one by one from the inclines onto the carriers, substantially as set forth.

2. The loading machine, comprising inclines for receiving the bars as they are brought from the mill, carriers for transferring the bars from the inclines to the place where they are to be deposited and separating mechanism for delivering the bars one by one to the carriers, and means whereby the said separating mechanism is under the control of the carriers to operate it, substantially as set forth.

3. The loading machine, comprising inclines for receiving the bars as they are brought from the mill, reciprocating carriers for moving the bars onto the inclines, endless carriers for transferring the bars from the inclines to the point where they are to be deposited and separating mechanism for delivering the bars one by one to the endless carriers, substantially as set forth.

4. The combination with the inclines for receiving the bars as they are brought from the mill, and carriers for receiving the bars as they leave the inclines, of a movable stop extending normally above the face of the inclines, a catch held normally below the face of the inclines and mechanism upon the carriers for simultaneously moving the stop and catch in opposite directions to deliver the bars one by one, substantially as set forth.

5. The combination with inclines for receiving the bars as they are brought from the mill and means for transferring the bars onto the inclines, of bar supports arranged horizontally in proximity to the inclines, a separating mechanism for delivering the bars one by one from the inclines and means for moving the bars along the horizontal supports, substantially as set forth.

6. The combination with continuously operating rollers for carrying the bars from the mill to a point opposite the loading mechanism, slides for receiving the bars from the said rollers and means for arresting the bars on the slides, of a reciprocating mechanism under the control of the operator independent of the mechanism for carrying the bars from the mill, said reciprocating mechanism being located to traverse back and forth beneath the path of the bars on the said rollers to transfer them from the rollers, substantially as set forth.

7. The combination with the rollers for advancing the bars from the mill, inclines for receiving the bars and means for transferring the bars laterally from the rollers onto the inclines, of a movable stop under the control of the operator to arrest or permit the bars to advance along the rollers at pleasure and a plate also under the control of the operator for retarding the bar before it reaches the stop, substantially as set forth.

8. The combination with the endless carriers for transferring the bars as they are advanced from the mill, of a tilting arm provided with an endless carrier for advancing the bars along it, skids pivoted to the free end of the tilting arm by means of a joint which will permit them to swing vertically and horizontally and means for supporting the tilting arm at the desired height, substantially as set forth.

9. The combination with the endless carriers for transferring the bars as they are advanced from the mill, of a tilting arm provided with an endless carrier for advancing the bars along it, means for supporting the tilting arm at the desired height and a guide located in position to direct the bars as they fall from the free end of the tilting arm, substantially as set forth.

10. The combination with the continuously moving rollers for advancing the bars from the mill and means for transferring the bars laterally from the rollers, of a movable stop for arresting the advance movement of the bars along the rollers at pleasure, a retarding plate for slowing the movement of the bar and a connection between the retarding plate and the movable stop by which the retarding plate is brought into action when the stop is lowered and then out of action when the stop is raised, substantially as set forth.

JOHN A. F. SVENSON.

Witnesses:
O. V. PENNEY,
R. M. STRATTON.